(No Model.) 2 Sheets—Sheet 1.

S. TROTT.
CONDUIT FOR ELECTRIC RAILWAYS.

No. 395,761. Patented Jan. 8, 1889.

WITNESSES:

INVENTOR:
Samuel Trott,
BY
ATTORNEYS.

(No Model.) 2 Sheets—Sheet 2.

S. TROTT.
CONDUIT FOR ELECTRIC RAILWAYS.

No. 395,761. Patented Jan. 8, 1889.

WITNESSES:

INVENTOR:
Samuel Trott,
BY
ATTORNEYS.

UNITED STATES PATENT OFFICE.

SAMUEL TROTT, OF HALIFAX, NOVA SCOTIA, CANADA.

CONDUIT FOR ELECTRIC RAILWAYS.

SPECIFICATION forming part of Letters Patent No. 395,761, dated January 8, 1889.

Application filed January 27, 1888. Serial No. 261,480½. (No model.)

*To all whom it may concern:*

Be it known that I, SAMUEL TROTT, a subject of the Queen of Great Britain, residing on board the Anglo-American Telegraph Company's steamship Minia, stationed at Halifax, Nova Scotia, Canada, have invented certain new and useful Improvements in Conduits for Electric Railways; and I do hereby declare that the following is a full, clear, and exact description of my invention, such as will enable others skilled in the art to which it appertains to make and use the same.

My invention has reference to electric-railway conduits, the object being to furnish the highest degree of insulation for the conducting-rail, and also to provide a construction which will be strong and at the same time comparatively inexpensive. So far as I am aware none of the existing conduits combine these qualities.

In many conduits the conducting-rails are mounted on arms or brackets supported from the walls in such a manner that a slight deposit of moisture, or even the collecting-brushes themselves, will make electrical connection between the rails and the conduit, and thus destroy the effectiveness of the structure. In other instances the conduits have been lined with or made from insulating material; but the former construction is expensive and the latter lacking in the requisite strength.

I construct my conduit preferably of cast-iron of suitable strength to resist any strain to which it is likely to be subjected. The conduit is provided with the usual opening or slot for admitting the contact-brushes. At intervals along the bottom of the conduit I mount on vertical pins or screws glass or porcelain insulators similar in construction to the ordinary telegraph-pole insulators. The insulators alternate with each other in two rows, and the conductors are supported in grooves formed in their tops.

The construction in detail will now be described with reference to the accompanying drawings, in which—

Figure 1:
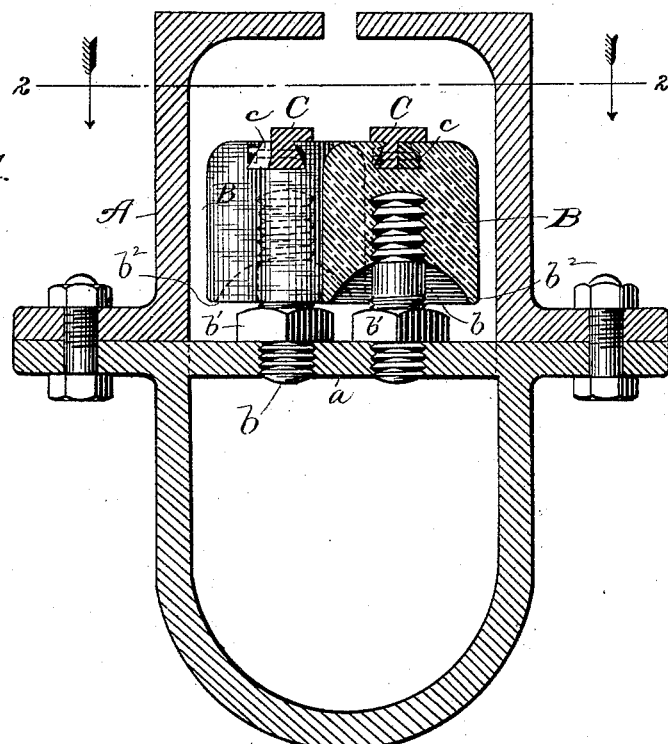
Figure 2:
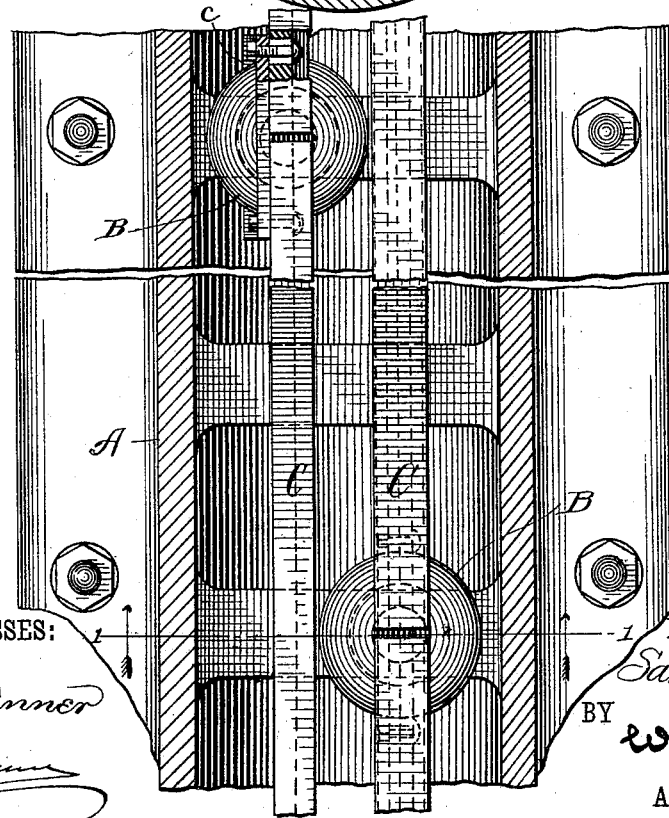
Figure 3:
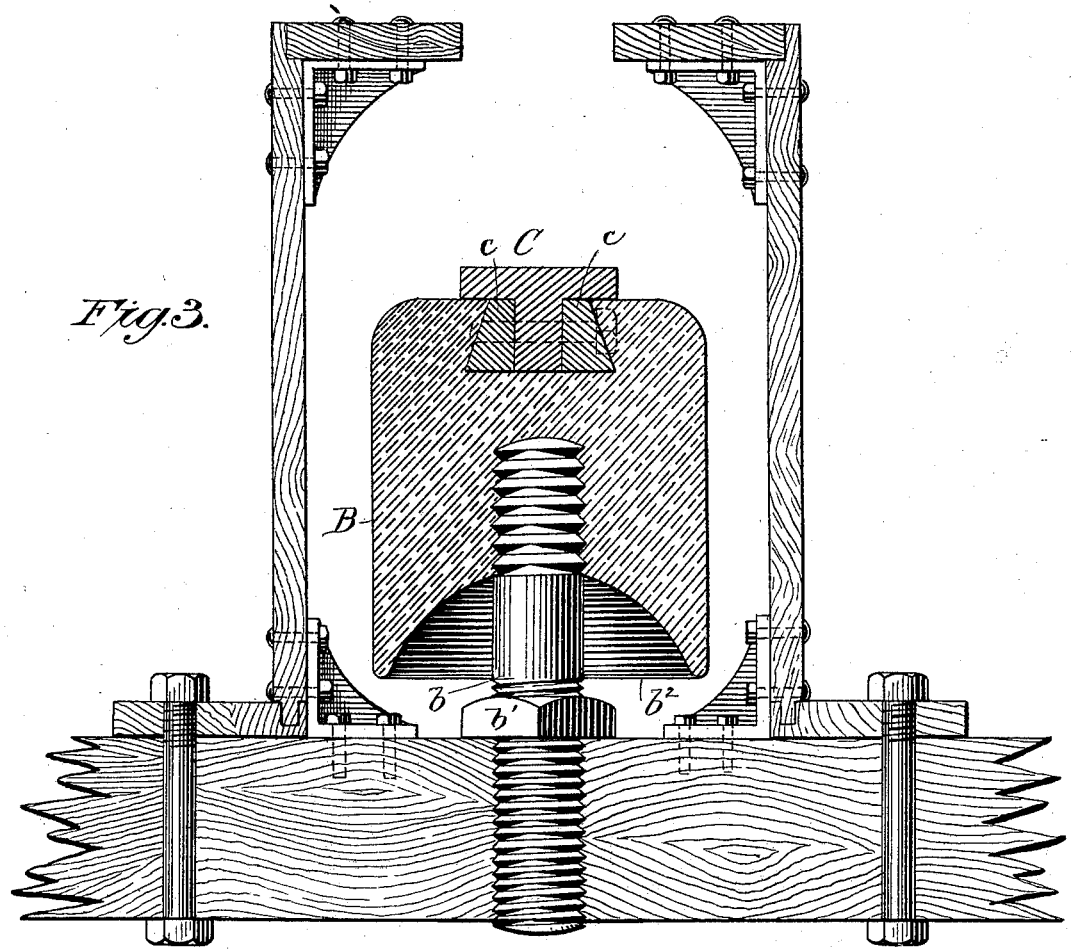
Figure 4:
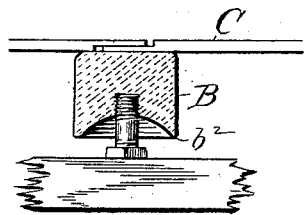

Figure 1 represents a transverse section of the conduit, showing the insulators and illustrating the manner of securing the conductors thereto. Fig. 2 is a plan of the conduit with the top removed. Fig. 3 illustrates my invention as applied to elevated railways or other similar structures, and Fig. 4 shows a modification of a rail-joint in detail.

Referring to the drawings by letter, A represents the conduit, which is made, preferably, of cast-iron of suitable dimensions and strength. It is provided with the usual opening in the top to admit the brush-arm. The conduit may be constructed with or without a drain as a part of the main casting; but the main floor $a$ of the conduit carries the insulators. The floor $a$ is made in skeleton work and supports at intervals pins or posts $b$, which screw into it, and when once set are secured by jam-nuts $b'$. The upper ends of the posts are also screw-threaded to receive the insulators.

B B are the insulators, preferably of glass or porcelain, although I do not limit myself to those materials. These insulators are made in the general shape of the ordinary glass insulator used on telegraph-poles—that is, they are concaved and provided on their under sides with openings for the pins. In this instance the concavity of the insulator plays an important part, as it effectually prevents connection between the rails and the pins or their support. Moisture which flows down the outer surface of the insulator from the conductor is shed from the edges $b^2$.

The conductor C is mortised or dovetailed into the top of the insulator and locked in by means of a metallic wedge or key, $c$. The conductor is first inserted, and the key is then pushed in and bolted to the conductor. In laying the conduit I prefer to place the conductors so that the joints will occur at the insulators. In this way no connector other than the key will be necessary. To allow for the expansion and contraction caused by changes in temperature, the bolts securing the key and conductor together pass through slots in the conductor and allow a slight longitudinal movement of the same. The bottom of the conduit being made in skeleton work or with frequent openings, there will be no danger of a short circuit from one rail to another or from one insulator to another by reason of the presence of water in large quantity.

In laying the apparatus for elevated roads or where the roads are built on a trestle-work, I prefer to dispense with the metallic conduit or box and to mount the insulators directly upon the sleepers or ties. The insulators themselves, however, may be protected by a frame or housing of wood or other suitable material, to prevent them from being injured by bodies falling or thrown upon them.

I claim as my invention—

1. A conduit for electric railways, having a metallic base which supports upright insulators carrying conductors, the insulators being mounted directly on the base of the conduit by means of upright pins, the insulators being also concaved at the bottom and each having a groove in its top to hold a conductor, substantially as described.

2. A conduit for electric railways, having a metallic base, in combination with a pair of conductors mounted upon upright insulators which are supported directly on the base of the conduit by means of upright pins, to which they are screwed, the said insulators being bell-insulators and grooved at the top to hold the conductors.

3. A metallic conduit for electric railways, upright pins screwed into the base thereof, jam-nuts for securing the pins, and bell-insulators screwed to the outer end of the pins, substantially as described.

4. The combination, with an insulator having a wedge-shaped groove, of an L-shaped conductor, each arm of the L being wedge-shaped, and a wedge or key for locking the conductor and insulator together.

In witness whereof I have hereunto signed my name in the presence of two subscribing witnesses.

SAMUEL TROTT.

Witnesses:
WM. A. ROSENBAUM,
H. DEININGER.